United States Patent [19]

Shibata et al.

[11] Patent Number: 5,410,228

[45] Date of Patent: Apr. 25, 1995

[54] METHOD AND APPARATUS FOR SUPPRESSING TORSIONAL VIBRATION IN AN ELECTRIC MOTOR SPEED CONTROL SYSTEM

[75] Inventors: Naotake Shibata, Chiyoda; Kaneyuki Hamada; Komei Hamamoto, both of Kitakyushu, all of Japan

[73] Assignee: Kabushiki Kaisha Yaskawa Denki, Fukuoka, Japan

[21] Appl. No.: 930,554

[22] PCT Filed: Feb. 5, 1992

[86] PCT No.: PCT/JP92/00110

§ 371 Date: Sep. 29, 1992

§ 102(e) Date: Sep. 29, 1992

[87] PCT Pub. No.: WO92/14296

PCT Pub. Date: Aug. 20, 1992

[30] Foreign Application Priority Data

Feb. 5, 1991 [JP] Japan .................................. 3-014517

[51] Int. Cl.[6] .............................................. H02P 7/00
[52] U.S. Cl. ...................................... 318/432; 318/434; 388/930
[58] Field of Search ............... 318/432, 434, 811, 721; 388/930, 800

[56] References Cited

U.S. PATENT DOCUMENTS

| 4,870,334 | 9/1989 | Iwasa et al. | 318/432 |
| 4,992,715 | 2/1991 | Nakamura et al. | 318/432 |
| 5,101,145 | 3/1992 | Rehm | 318/432 |

FOREIGN PATENT DOCUMENTS 57-83181  5/1982  Japan .
2-219485  9/1990  Japan .

Primary Examiner—William M. Shoop, Jr.
Assistant Examiner—Karen Masih
Attorney, Agent, or Firm—Jordan and Hamburg

[57] ABSTRACT

Herein disclosed are a method and an apparatus for suppressing a torsional vibration in an electric motor speed control system including a mechanism for transmitting a drive torque from an electric motor to a load through a drive shaft having a torsional spring system. Generally speaking, the signal of a speed detector (3) of an electric motor is a pulsating signal of high frequency. Even if this speed detecting signal is differentiated, it is impossible to obtain a signal proportional to the changing rate of the motor speed. By computing an average value of the signals of the motor speed detector (3) for every predetermined period, however, the pulsating value of the speed signal can be reduced to compute the changing rate of the motor speed from that signal. In the present invention, an acceleration torque command of the electric motor is given in terms of the output signal of a speed controller (11) to cancel the load torque of the electric motor from disturbing the acceleration torque of the motor, with the torque command compensating signal outputted from a motor acceleration torque controller (25) having a proportional gain and an integrator. As a result, the disturbing torque of the electric motor, which is generated by the load and the torsion of the drive shaft during an acceleration and at an abrupt load fluctuating time, is canceled so that the torsional vibration is suppressed to stabilize the variable speed characteristics.

16 Claims, 16 Drawing Sheets t (秒)

$N_{REF}$ = SPEED COMMAND
$N_M$ = MOTOR SPEED
$N_L$ = LOAD SIDE MACHINE SPEED
$N_B$ = OPPOSITE SIDE ROTARY MEMBER SPEED
$T_M$ = MOTOR TORQUE
$T_{L1}$ = MOTOR LOAD SIDE DRIVE SHAFT TORQUE
$T_{L2}$ = LOAD TORQUE
$T_B$ = MOTOR OPPOSITE SIDE DRIVE SHAFT TORQUE

| | |
|---|---|
| $N_{REF}$ | = SPEED COMMAND |
| $N_M$ | = MOTOR SPEED |
| $N_L$ | = LOAD SIDE MACHINE SPEED |
| $T_M$ | = MOTOR TORQUE |
| $T_{L1}$ | = MOTOR LOAD SIDE DRIVE SHAFT TORQUE |
| $T_{L2}$ | = LOAD TORQUE |

SPEED CHARACTERISTICS

TORQUE CHARACTERISTICS $N_{REF}$ = SPEED COMMAND
$N_M$ = MOTOR SPEED
$N_L$ = LOAD SIDE MACHINE SPEED
$T_M$ = MOTOR TORQUE
$T_{L1}$ = MOTOR LOAD SIDE DRIVE SHAFT TORQUE
$T_{L2}$ = LOAD TORQUE

METHOD AND APPARATUS FOR SUPPRESSING TORSIONAL VIBRATION IN AN ELECTRIC MOTOR SPEED CONTROL SYSTEM

FIELD OF THE INVENTION

The present invention relates to a method and an apparatus for suppressing the torsional vibration of a drive control unit for controlling the rotational speed of an electric motor in a mechanical facility which is equipped with a mechanism for transmitting a drive torque from the electric motor to a load through a drive shaft of low torsional rigidity disposed at the load side of the electric motor and, more particularly, to a method and an apparatus for a drive control unit for controlling the rotational speed of an electric motor in facilities which are equipped with a mechanism for transmitting a rotational torque to a machine through a drive shaft of low torsional rigidity disposed at the load side of the electric motor and a mechanism having a speed detector mounted on the shaft of a rotor for transmitting a rotational torque to the rotor through a drive shaft of low torsional rigidity disposed at the side opposite the load.

BACKGROUND OF THE INVENTION

FIG. 1 is a mechanical diagram showing a variable speed drive apparatus. The rotational torque is transmitted to a machine 5 from an electric motor 2 through a drive shaft 4 having a torsional rigidity of K [Kgm/rad].

A variable speed control unit 1 controls the speed of the electric motor 2 by using a signal, which is detected by a speed detector 3 attached to the electric motor 2, as a speed feedback signal.

FIG. 2 is a block diagram showing a speed control unit including the well-known torsional vibration system. As shown in FIG. 2, the speed control unit 11 has an integrator having a proportion gate A and a time constant $\tau_I$ and amplifies a deviation between a speed command $N_{REF}$ as indicated at 10 and a speed feedback signal $N_{MFB}$ to output a torque command signal $T_{REF}$. When the torque command signal $T_{REF}$ is inputted to a motor torque controller 17, this motor torque controller 17 controls the torque of the electric motor with a linear delay time constant $\tau_T$. Incidentally, the speed feedback signal $N_{MFB}$ is prepared from the rotational speed $N_M$ of the electric motor through a linear delay first-order lag element 16 (wherein $\tau_F$: a speed detection filter delay time constant).

A motor torque $T_M$ is controlled in accordance with the aforementioned torque command signal $T_{REF}$.

Reference numeral 12 designates a block indicating the mechanical time constant $\tau_M$ of the electric motor; numeral 13 designates a block indicating a torsional time constant $\tau_V$; and numeral 14 designates a block indicating the mechanical time constant $\tau_L$ of the load.

On the other hand, numeral 15 designates the load torque $T_{L2}$ upon the machine 5, and letters $N_L$ designate the speed of the load.

In the block diagram of FIG. 2, a ramping (or linearly accelerated) speed command $N_{REF}$ is fed to the input. If a torsion is established in the drive shaft 4 when the motor speed $N_M$ and the load speed $N_L$ occur, a transient gain of the speed control system abruptly occurs with a mechanical resonance frequency of the rotational motion, which is determined by the torsional rigidity of the drive shaft, the inertia of the electric motor, and the combined inertia of the machine and the load. As a result, there occur periodic speed fluctuations which are detrimental to the machine facilities, as shown in FIG. 3.

As means for solving this problem, according to the prior art, a vibration suppressing filter 18 is inserted at the output side of the speed controller 11, as shown in FIG. 4, so as to reduce the transient gain at the resonance point of the mechanical system. The torsional vibration suppressing filter 18 is given a transmission function, as expressed by the following formula:

$$1/\{(s/\omega_F)^2 + 2\delta_F(s/\omega_F) + 1\} \tag{1}$$

wherein: $\omega_F$ designates a transient gain reduction starting angular frequency; $\delta_F$ designates a filter characteristic constant; and s designates a Laplacian operator.

In the prior art, the filter angular frequency $\omega_F$ and the filter characteristic constant $\delta_F$, as appearing in the above Formula, and the proportional gain A of the speed controller 11 are adjusted for all facilities to select a filter constant for reducing the influence of the torsional vibration.

In the prior art, however, the speed control system is made unstable if the filter constants $\omega_F$ and $\delta_F$ are merely selected for all facilities and adjusted, because the phase delay angle between the speed command and the speed feedback signal of the speed control system is further increased by incorporating the filter. This frequently makes it necessary to drastically reduce the proportional gain A of the speed controller so that the responsiveness of the speed control system is drastically lowered. Thus, there arises the problem that the speed control responding characteristics necessary for the facilities cannot be attained.

In addition, FIG. 5 is another mechanical diagram showing an ordinary variable speed drive apparatus. To the machine 5, the rotational torque is transmitted by the electric motor 2 through the drive shaft 4 having a low torsional rigidity $K_1$. To the rotor 6 of the electric motor 2 at the side opposite the load, the rotational torque is transmitted by the electric motor 2 through a drive shaft 7 having a torsional rigidity $K_2$. To the shaft of the rotor 6, the speed detector 3 is attached for detecting the speed of the rotor 6.

The variable speed control unit 1 is fed as a speed feedback signal $N_{FB}$ with the signal, which is prepared from the signal detected by the speed detector 3 through the filter having a first-order lag element, to control the speed of the electric motor 2.

FIG. 6 is a block diagram showing a speed control including the torsional vibration system shown in FIG. 5. As shown in FIG. 6, the speed controller 11 has an integrator having the proportional gain A and the time constant $\tau_I$ and amplifies the deviation between the signal command $N_{REF}$, as designated at 10, and the speed feedback signal $N_{FB}$ to output the torque command signal $T_{REF}$. When the torque command signal $T_{REF}$ is inputted to the motor torque controller 17, this motor torque controller 17 controls the torque of the electric motor with the linear delay time constant $\tau_T$. Incidentally, the speed feedback signal $N_{FB}$ is prepared through a first-order lag element 19 (wherein $\tau_{F0}$ designates a speed detection filter delay time constant) from the signal detected by the speed detector 3.

The motor torque $T_M$ is controlled in accordance with the aforementioned torque command signal $T_{REF}$.

The numeral 12 designates the block indicating the mechanical time constant $\tau_M$ of the electric motor; the numeral 13 designates a block indicating the torsional time constant $\tau_{V1}$ of the drive shaft of the electric motor at the load side; the numeral 14 designates a block indicating the mechanical time constant $\tau_L$ of the load; the numeral 15 designates the load torque $T_{L2}$ to be applied to the machine 5; and the letters $N_L$ designate the speed of the machine. Moreover, numeral 20 designates a block indicating a torsional time constant $\tau_{V2}$ of the drive shaft 7 of the electric motor at the side opposite the load, and numeral 21 designates a block indicating the mechanical time constant $\tau_B$ of the rotor 6 of the electric motor at the side opposite the load.

The ramping (or linearly accelerated) speed command $N_{REF}$ is fed to the input, as shown in the block diagram of FIG. 6. When the motor speed $N_M$ and the load speed $N_L$ occur, the transient gain of the speed control system is abnormally raised by the mechanical resonance frequency of the rotational motion, which is determined by the inertia of the individual rotating portions and the torsional rigidity $K_2$ of the drive shaft 7, if a torsion arises in the drive shaft 7 of the electric motor 2 at the side opposite the load. As a result, periodic speed fluctuations occur which are detrimental to the mechanical facilities and the products during the acceleration of the electric motor, as shown in FIG. 7.

If the load abruptly changes after the end of an acceleration of the electric motor so that a torsion arises in the drive shaft 4 of the electric motor 2 at the load side, the transient gain of the speed control system is abnormally raised by the mechanical resonance frequency of the rotational motion, which is determined by the inertia of the individual rotational portions and the torsional rigidity $K_1$ of the drive shaft 4. As a result, after the abrupt change of the load speed fluctuations occur which are detrimental to the mechanical facilities and the products, as shown in FIG. 7.

As means for solving this problem, according to the prior art, a vibration suppressing filter 22 is inserted at the output side of the speed controller 11, as shown in FIG. 8, so as to reduce the transient gain at the resonance point of the mechanical system. The torsional vibration suppressing filter 22 is given a transmission function, as expressed by the following formula:

$$1/\{(s/\omega_{F0})^2 + 2\delta_{F0}(s/\omega_{F0}) + 1\} \quad (2),$$

wherein: $\omega_{F0}$ designates a transient gain reduction starting angular frequency; $\delta_{F0}$ designates a filter characteristic constant; and s designates a Laplacian operator.

In the prior art, the filter angular frequency $\omega_{F0}$ and the filter characteristic constant, $\delta_{F0}$ as appearing in the above Formula, and the proportional gain A of the speed controller 11 are adjusted for all facilities to select a filter constant for reducing the influence of the torsional vibration.

In the prior art, however, the speed control system is made unstable if the filter constants $\omega_{F0}$ and $\delta_{F0}$ are merely selected for all facilities and adjusted, because the phase delay angle between the speed command and the speed feedback signal of the speed control system is further increased by incorporating the filter. This frequently makes it necessary to drastically reduce the proportional gain A of the speed controller so that the responsiveness of the speed control system is drastically lowered. Thus, there arises the problem that the speed control responding characteristics necessary for the facilities cannot be attained.

SUMMARY OF THE INVENTION

It is, therefore, an object of the present invention to provide a method of suppressing torsional vibration to be generated either at the load side of an electric motor or at the load and opposite sides of the electric motor, without causing deterioration in the responsiveness of a speed control system.

In order to achieve this object, according to a first aspect of the present invention, there is provided a method of suppressing torsional vibration in an electric motor speed control system including a mechanism for transmitting a drive torque from an electric motor to a load through a drive shaft having a torsional spring system, comprising the steps of: computing an average value of motor speed detecting signals for every predetermined period; computing a torque command signal $T_{RFA}$ from the deviation signal between the computed average speed $N_{MAVG}$ and a speed command $N_{REF}$ by a speed controller having either a proportional gain and an integrator or only the proportional gain, to use the torque command signal $T_{RFA}$ as a motor acceleration torque command; computing a torque command compensating signal $T_{RFL}$ for canceling the load torque of the electric motor from acting as a disturbance torque upon the acceleration torque of the electric motor by a motor acceleration torque controller having a proportional gain and an integrator, from the deviation signal between said motor acceleration torque command and the signal to be used as a feedback signal of the motor acceleration torque, which is prepared by multiplying a signal made by differentiating said motor average speed signal $N_{MAVG}$ by the mechanical time constant $\tau_M$; and controlling the electric motor by using a signal $T_{RFM}$, which is prepared by adding said torque command compensating signal $T_{RFL}$ to the torque command signal $T_{RFA}$ outputted from said speed controller, as the torque command of the electric motor.

Generally speaking, the signal of a speed detector of an electric motor contains a pulsating signal of high frequency. Even if this speed detecting signal is differentiated, it is impossible to obtain a signal proportional to the changing rate of the motor speed. By computing an average value of the signals of the motor speed detector for every predetermined period, however, the pulsating value of the speed signal can be reduced to compute the changing rate of the motor speed from that signal.

In the present invention, an acceleration torque command of the electric motor is given, in terms of the output signal of a speed controller, to cancel the load torque of the electric motor from disturbing the acceleration torque of the motor, with the torque command compensating signal outputted from a motor acceleration torque controller having a proportional gain and an integrator. As a result, the disturbing torque of the electric motor, which is generated by the load and the torsion of the drive shaft during an acceleration and at an abrupt load fluctuating time, is canceled so that the torsional vibration is suppressed to stabilize the variable speed characteristics.

According to a second aspect of the present invention, there is provided a method of suppressing a torsional vibration in an electric motor speed control system including a mechanism for transmitting a rotational torque to a machine at a load side of an electric motor through a drive shaft of low torsional rigidity disposed at the load side, and a mechanism for transmitting the rotational torque to a rotor at the side of the electric motor opposite a load through a drive shaft of low torsional rigidity disposed at the side opposite the load, said method comprising the steps of: computing an average value of the signals, which are detected by a speed detector mounted on the rotational shaft of the rotor of an electric motor at the side opposite the load, for every predetermined period; computing a torque command signal $T_{TRA}$ from a deviation signal between the computed average speed $N_{MAVG}$ and a speed command $N_{REF}$ by a speed controller having either a proportional gain and an integrator or only the proportional gain, to use the torque command signal $T_{RFA}$ as a motor acceleration torque command; generating a torque compensation signal $T_{RFL}$ for canceling the load torque of the electric motor from acting as a disturbance torque upon the acceleration torque of the electric motor through a filter having a quadrant delay element, from a signal which is computed by a motor acceleration torque controller having a proportional gain and an integrator, from the deviation signal between said motor acceleration torque command and the signal, which is prepared as the feedback signal of the motor acceleration torque by multiplying a signal made through a filter having a first-order lag element by differentiating said average speed signal $N_{MAVG}$ by the mechanical time constant $\tau_M$; and controlling the electric motor by using a signal $T_{RFM}$, which is prepared by adding said torque command compensating signal $T_{RFL}$ to the torque command signal $T_{RFA}$ outputted from said speed controller, as the torque command of the electric motor.

In the present invention, the acceleration torque command of the electric motor is given in terms of the output signal of the speed controller, and the motor acceleration torque signal, which is obtained by multiplying the signal prepared by differentiating the speed feedback signal by the mechanical time constant of the electric motor, is fed back. A control is made in the canceling direction by the motor acceleration torque command compensating signal, which is computed from the deviation signal between the motor acceleration torque command and the motor acceleration torque signal through the motor acceleration controller constructed by inserting the filter having the second-order lag element at the output side of the proportional integration computer. As a result, during the acceleration and at the abrupt load fluctuating time, the disturbance torque of the electric motor, which is generated at the torsions of the drive shaft at the load side and at the opposite side, is canceled. Since the speed feedback signal is influenced by the torsional vibration of the drive system at the side opposite to the load to contain a pulsating signal of high frequency, it produces, if differentiated, a signal proportional to the changing rate of the rotational speed of the electric motor, as needed, and a signal containing a high pulsating frequency so that it contains a high computation error. In the present invention, however, this computation error is reduced by drastically attenuating the pulsating signal having the high frequency, which is generated by the computation of the speed changing rate, through the filter having the second-order lag element inserted into the output side of the motor acceleration torque controller.

Thus, a stabilized motor acceleration torque compensating signal can be obtained to suppress torsional vibrations at the load and opposite sides of the electric motor thereby to provide stable variable speed characteristics.

DESCRIPTION OF THE PREFERRED EMBODIMENT

Figure 1:
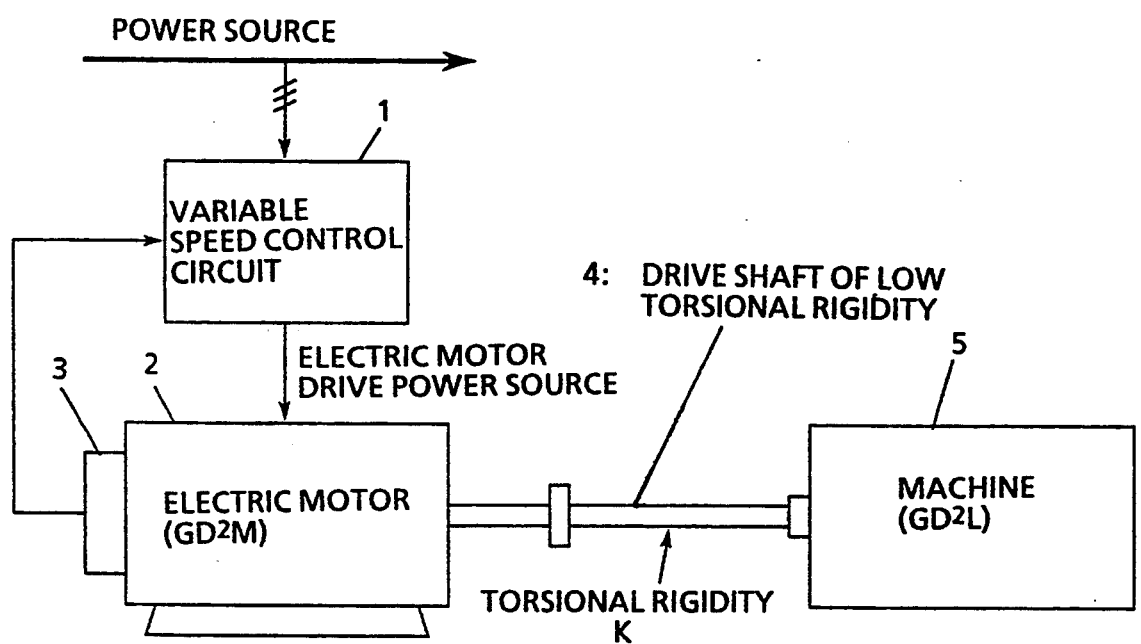
FIG. 1 is a diagram showing the construction of a variable speed control unit including a drive shaft of low torsional rigidity at a load side.
Figure 2:
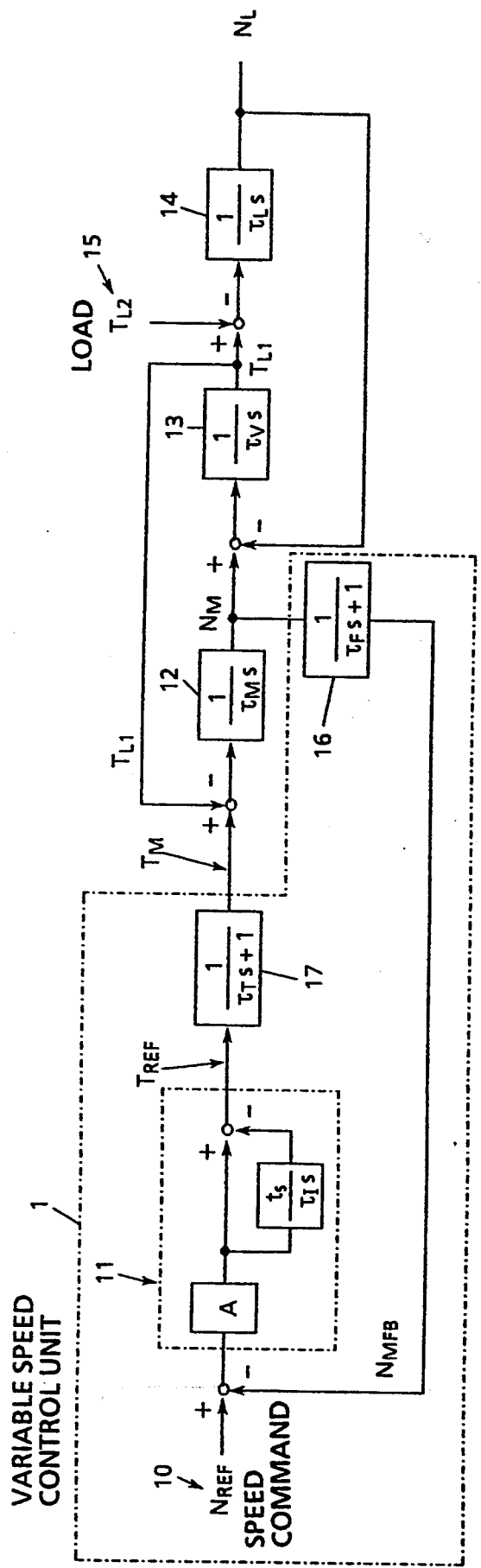
FIG. 2 is a block diagram showing the speed control of a speed control system of the prior art for the system of FIG. 1.
Figure 3:
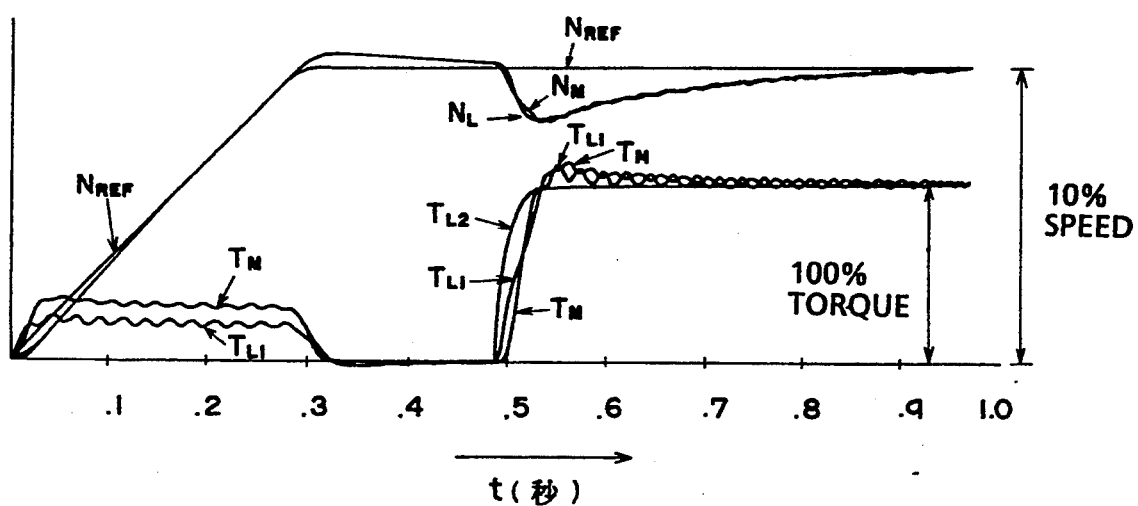
FIG. 3 is a diagram showing the acceleration characteristics and load responding characteristics of a speed control unit where the speed control unit is seriously influenced by a torsional vibration.
Figure 4:
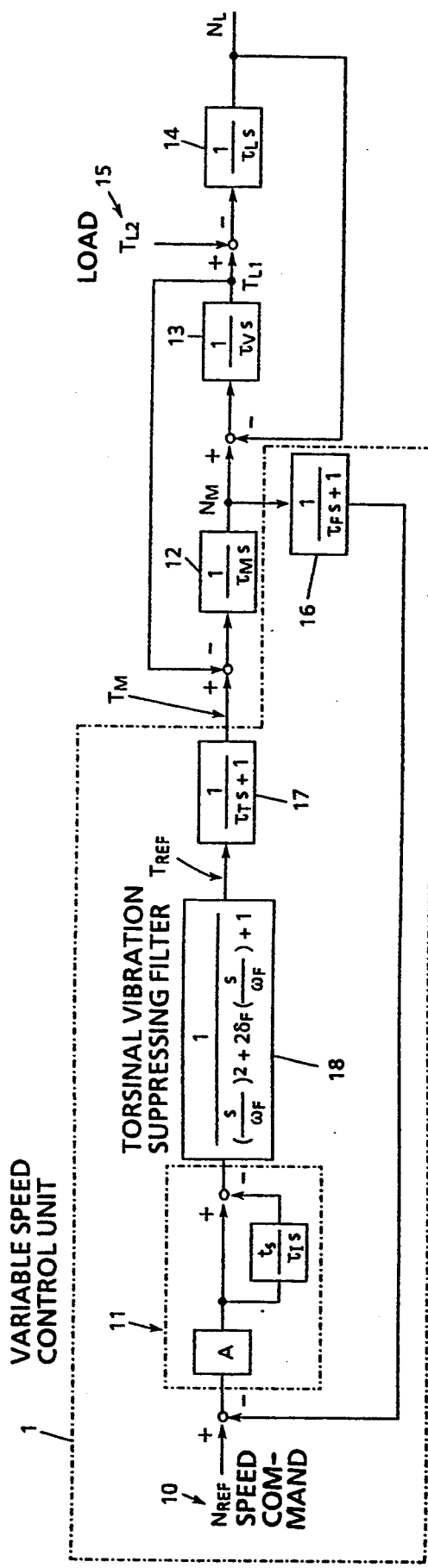
FIG. 4 is a block diagram showing a speed control system equipped with a torsional vibration suppressing filter of the prior art.
Figure 5:
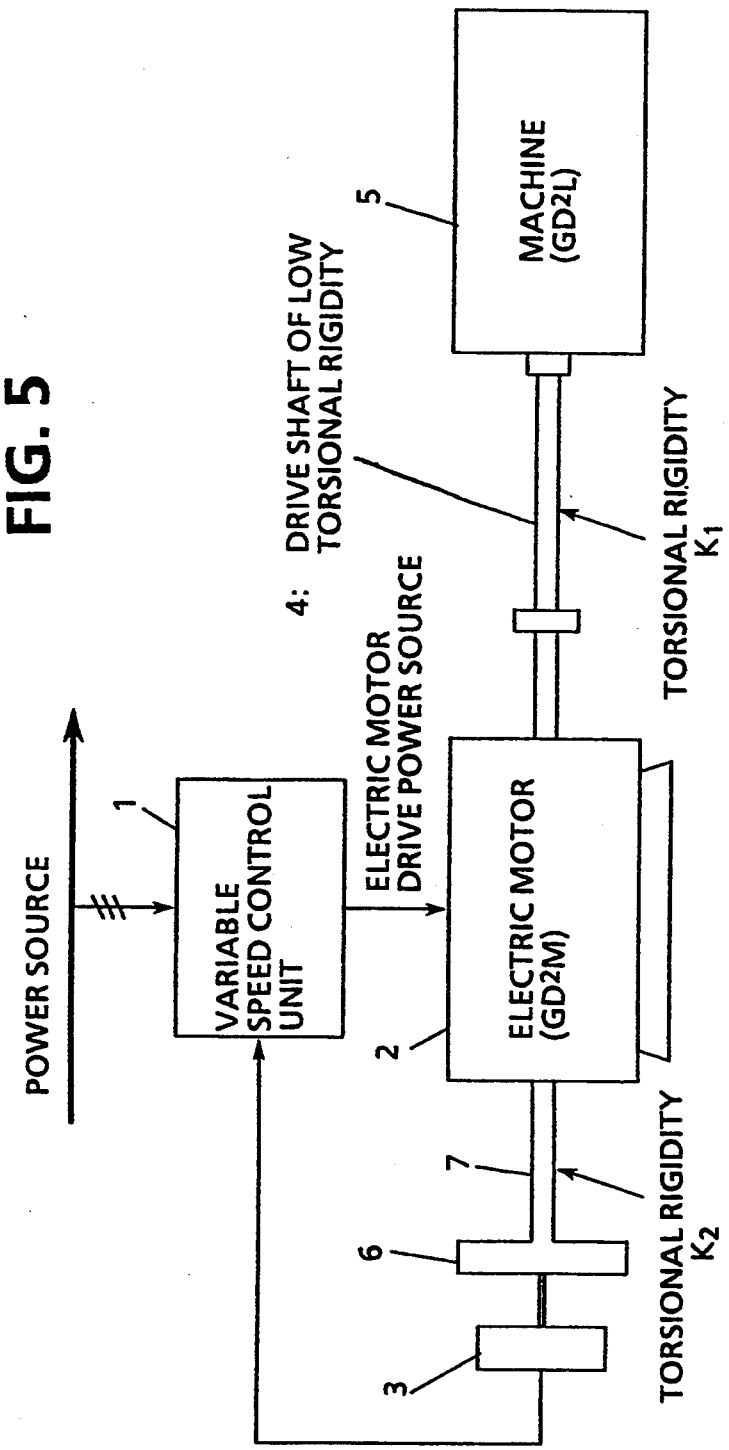
FIG. 5 is a diagram showing the construction of a variable speed control unit including a vibratory shaft of low torsional rigidity at a load side and at the opposite side.

A speed control unit having a speed controller constructed of an analog computer is shown as a first embodiment of the present invention in FIG. 1. The description of the same components as those of FIG. 2 showing the example of the prior art will be omitted by designating them with the identical reference characters.

Figure 9:
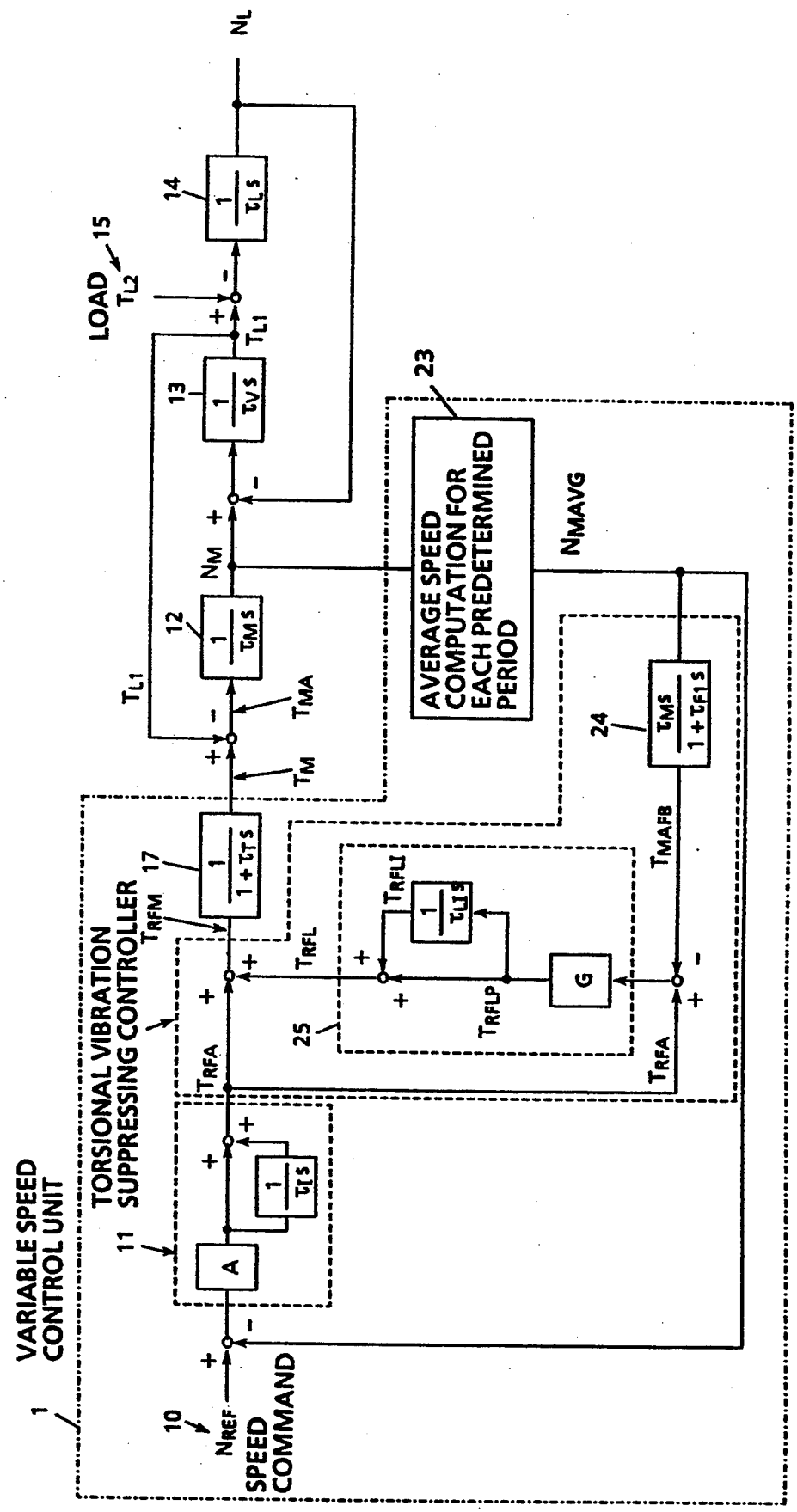
FIG. 9 is a block diagram showing the construction of a first embodiment of the present invention.

In the present embodiment, an average value of the signals of a speed detector 3 (as shown in FIG. 1) mounted on the drive shaft of the electric motor is computed for a predetermined period $t_S$ by an average speed computer 19, 23, as shown in FIG. 9.

According to this method of computing the average speed for every predetermined period, the average speed for the period $t_S$ can be determined as an average frequency of pulses for the period $t_S$ by dividing the counted value of the pulse signals outputted for the period $t_S$ from the speed detector 3 (if this speed detector 3, for example, is a pulse signal generator) by $t_S$. In case of an analog type speed detection generator, the signals of the speed detector are read n-times for the predetermined period $t_S$ so that the average value for the period $t_S$ can be obtained from the one n-th of the total of those signals.

The operation of a speed controller 11 will be described at first by designating the motor average speed for every predetermined period at $N_{MAVG}$.

If the speed command $N_{REF}$, the motor average speed $N_{MAVG}$ and their deviation are inputted to the speed controller 11, this controller 11 outputs the signal, which is the addition of a signal prepared by multiplying the speed deviation signal by the proportional gain A and a signal prepared by integrating the prepared signal with the time constant $\tau_I$, as the torque command signal $T_{RFA}$. In case the speed controller 11 has the proportional gain A only, it outputs the signal, which is prepared by multiplying the corresponding speed deviation signal by the gain A, as the torque command signal $T_{RFA}$.

The operation of a motor acceleration torque computer 24 will be described in the following.

If the motor average speed $N_{MAVG}$ of every predetermined period is inputted to the motor acceleration torque computer 24, the signal $T_{MAFB}$, having a value determined by multiplying the differentiated value of the average speed $N_{MAVG}$ by the mechanical time constant $\tau_M$ of the electric motor, is outputted. That signal $T_{MAFB}$ is an acceleration torque signal of the electric motor.

The first-order lag element in the motor acceleration computer 24 is a time constant $\tau_{F1}$ which is produced as an incomplete differentiation in the analog system.

The operation of a motor acceleration torque controller 25 will be described in the following.

The torque command signal $T_{RFA}$ of the speed controller 11 is used as the acceleration torque command of the electric motor, and the output signal $T_{MAFB}$ of the motor acceleration torque computer 24 is fed back as the acceleration torque signal of the electric motor in response to said acceleration torque command. If the deviation of those two signals is inputted to the motor acceleration torque controller 25, this controller 25 outputs the signal $T_{RFL}$, which is the addition of a signal $T_{RFLP}$ prepared by multiplying the deviation signal of those two signals by a proportional gain G and a signal $T_{RFLI}$ prepared by integrating the signal $T_{RFLP}$ with a time constant $\tau_{LI}$, so that the motor acceleration torque signal $T_{MAFB}$ may be identical to the torque command signal $T_{RFA}$ outputted from the speed controller 11. The torque control of the electric motor is carried out by using the signal, which is the addition of the torque command signal $T_{RFA}$ outputted from the speed controller 11 and the output signal $T_{RFL}$ of the motor acceleration torque controller 25, as the torque command $T_{RFM}$ so that the load torque $\tau_{L1}$ disturbing the acceleration torque of the electric motor is canceled by the torque command compensating signal $T_{RFL}$ outputted by the motor acceleration torque controller 25. As a result, the aforementioned motor torque command signal acts to cancel the disturbing torque of the electric motor, which is generated by the torsion of the drive shaft during an acceleration or at an abrupt load changing time, from suppressing the torsional vibration.

This will be further described in the following. In FIG. 9, $T_{RFA}$, $T_{RFL}$, $T_{RFM}$, $T_M$, $T_{MA}$ and $T_{L1}$ are expressed by the point of unit (P.U) method and satisfy the following relations:

$$T_{MA} = T_M - T_{L1} \quad (3); \text{ and}$$

$$T_{RFM} = T_{RFA} + T_{RFL} \quad (4).$$

If a torque control delay by the motor torque controller 17 is ignored because it is small, $T_M$ is approximately indicated as the equation (5):

$$T_M \doteq T_{RFM}$$

The equation (3) thereby becomes the equation (6), in view of the equations (4) and (5):

$$T_{MA} \doteq T_{RFA} + T_{RFL} - T_{L1} \quad (6)$$

The torque command compensating signal $T_{RFL}$ which is an output from the motor acceleration controller 25 is expressed by the following equation by using the torque command $T_{RFA}$ which is an output from the speed controller 11:

$$T_{RFL} = (T_{RFA} - N_M \tau_M S) G \left( \frac{1 + \tau_{L1} S}{\tau_{L1} S} \right) \quad (7)$$

where G is a proportional gain of the acceleration controller 25. The accelerating torque $T_{MA}$ is expressed by the following equation:

$$T_{MA} = N_M \tau_M S \quad (8)$$

If $T_{MA}$ of equation (8) is substituted for equation (7), then the following equation results:
If $T_{MA}$ of equation (6) is substituted for equation (9), $T_{RFA}$ is $$T_{RFL} \approx (T_{RFA} - T_{MA}) G \left( \frac{1 + \tau_{L1} S}{\tau_{L1} S} \right) \quad (9)$$

eliminated, to produce the following equation:

$$T_{RFL} \approx \left( \frac{1 + \tau_{L1} S}{1 + \left( \frac{1 + G}{G} \right) \tau_{L1} S} \right) T_{L1} \quad (10)$$

If the proportional gain G of the acceleration controller 25 can be set to a sufficiently large value, $(1+G)/G$ is nearly equal to 1, and equation (10) is expressed as:

$$T_{RFL} \doteq T_{L1}$$

Even if the value of G can't be set to a sufficiently large value, the Laplacian operand S approaches zero as time goes by, and $$T_{RFL} \doteq T_{L1}$$

is concluded.

As explained above, the load disturbance torque of the motor $T_{L1}$ is almost perfectly cancelled by the torque command compensating signal $T_{RFL}$ which is an output of the motor acceleration controller 25.

Figure 10:
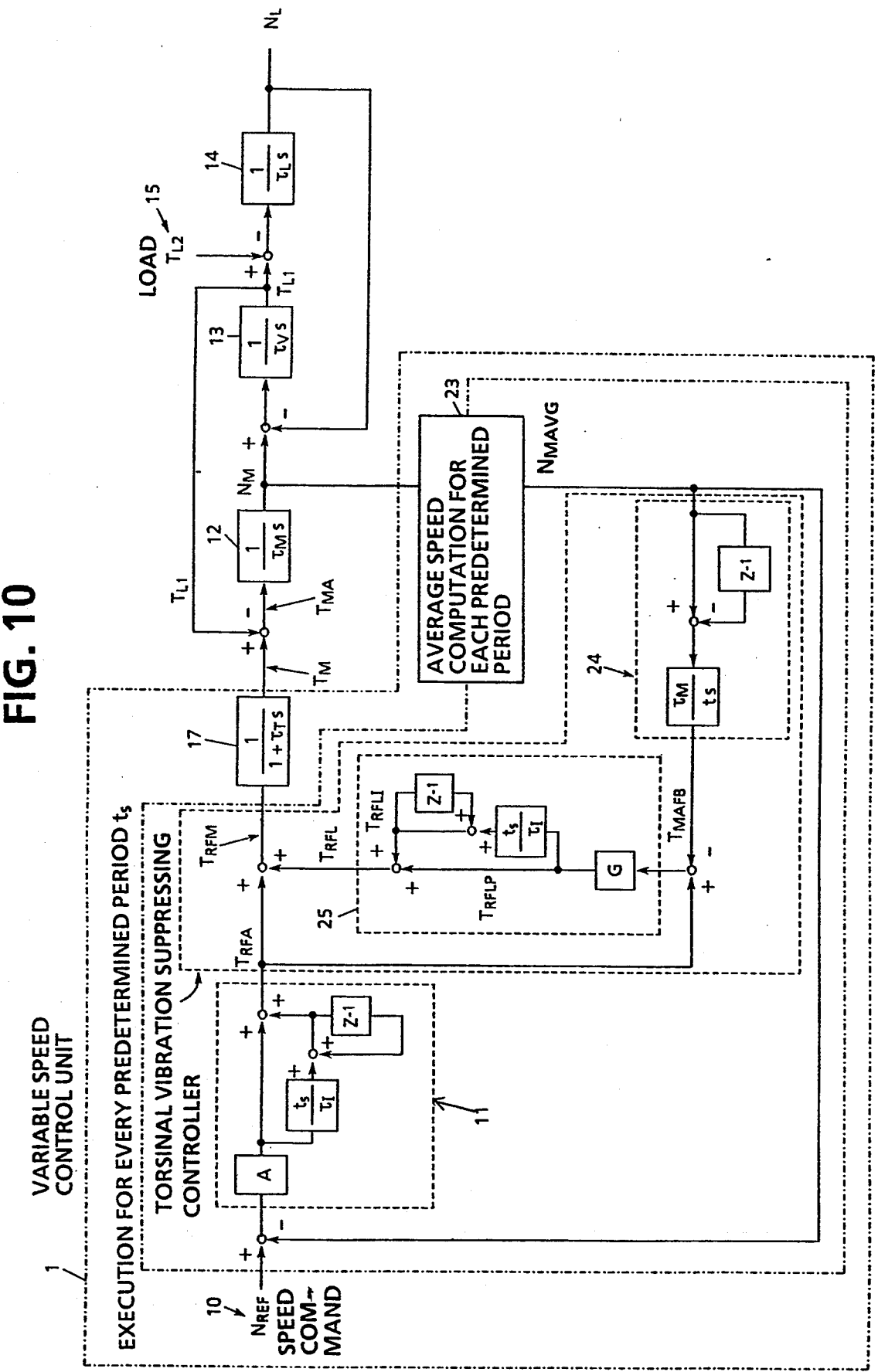
FIG. 10 is a block diagram showing the construction of a second embodiment of the present invention.

Next, a block diagram of the second embodiment of the present invention, which is applied to a speed control unit having a speed controller constructed of a digital computer, is shown in FIG. 10. The description to be made will be limited to the differences from the block diagram of the analog control system of FIG. 9.

As shown in FIG. 10, the speed controller 11, the motor average speed computer 23, the motor acceleration torque computer 24 and the motor acceleration torque controller 25, as enclosed by single-dotted lines, are executed for every predetermined period $t_S$.

Figure 11:
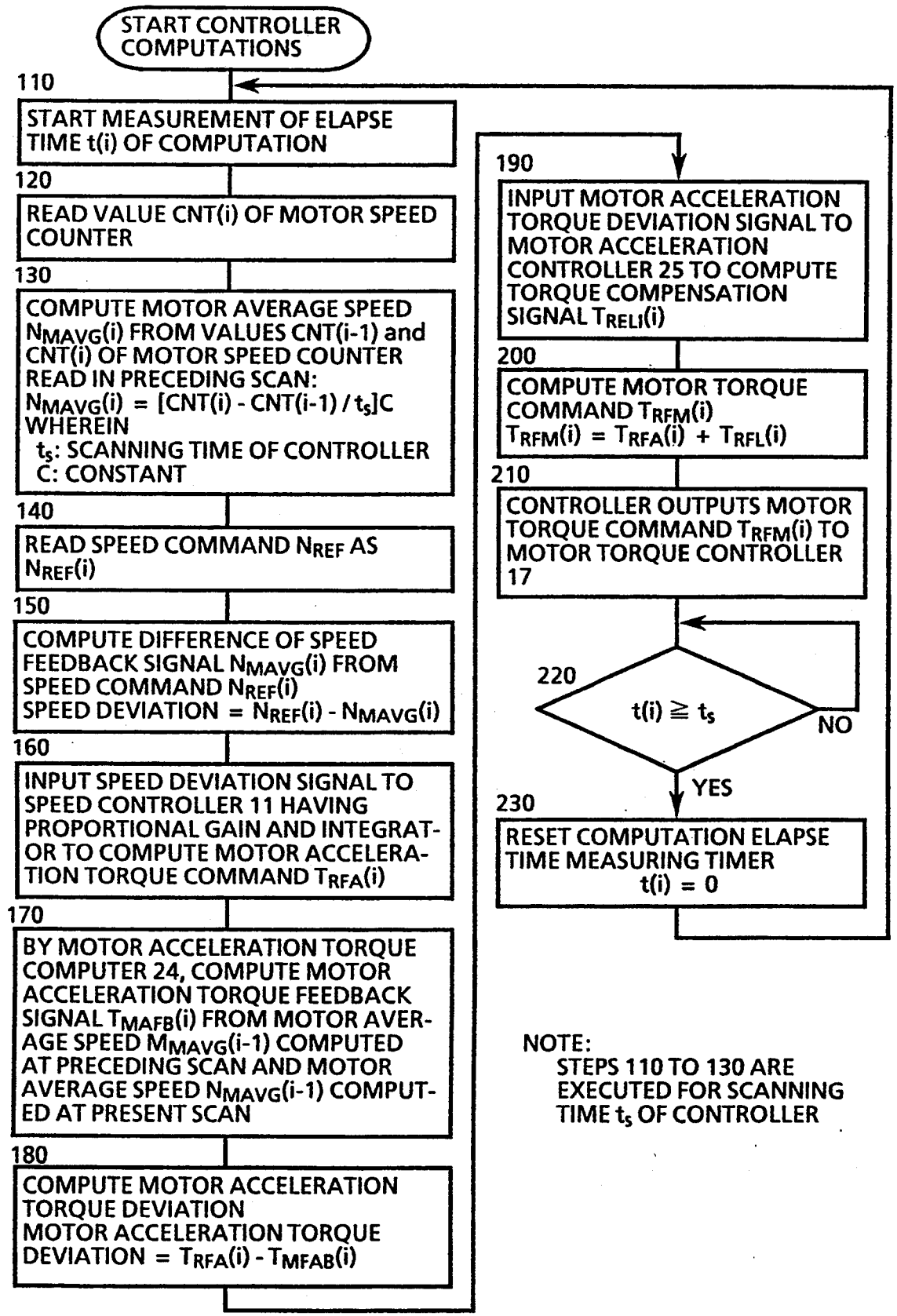
FIG. 11 is a flow chart showing the computations in the second embodiment.

FIG. 9 is a block diagram showing the analog computing method, the control of which can also be realized by digital computation. An example of this digital computing method is shown in the block diagram of FIG. 10, and its flow chart is shown in FIG. 11.

Although the method of FIG. 9 is carried out by analog computation, the method of FIG. 10 is carried out by digital computation in place of that analog computation. An example of the computation will be described in connection with the motor acceleration torque computer 24.

Now, if the average speed signal computed by the average speed computer is $N_{MAVG}(n)$ for $t=t_n$, the average speed computed $t=t_{n-1}=t_n-t_1$ is $N_{MAVG}(n-1)$ and is expressed as a product of $N_{MAVG}$ and a Z function $Z^{-1}$ in the block diagram.

The motor acceleration torque computer 24 performs a computation of $[N_{MAVG}(n)-N_{MAVG}(n-1)]/t_S$ to determine the changing rate of the motor speed.

The signal $\{[N_{MAVG}(n)-N_{MAVG}(n-1)] \cdot \tau_M/t_S\}$, which is prepared by multiplying that changing rate by the mechanical time constant $\tau_M$, is the motor acceleration torque feedback signal $T_{MAFB}$.

Figure 12:
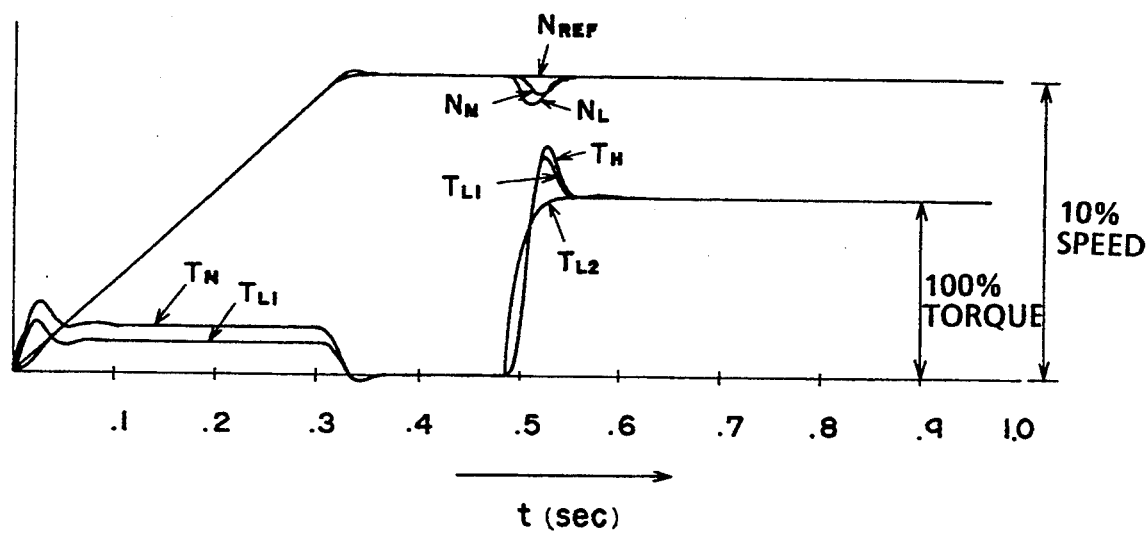
FIG. 12 is a diagram showing the acceleration characteristics and load responding characteristics of the speed control unit and exhibiting the effects of the present embodiment.

FIG. 12 shows the stable variable speed characteristics, in which the axial vibrations are suppressed by applying the digital method of the present invention.

Figure 6:
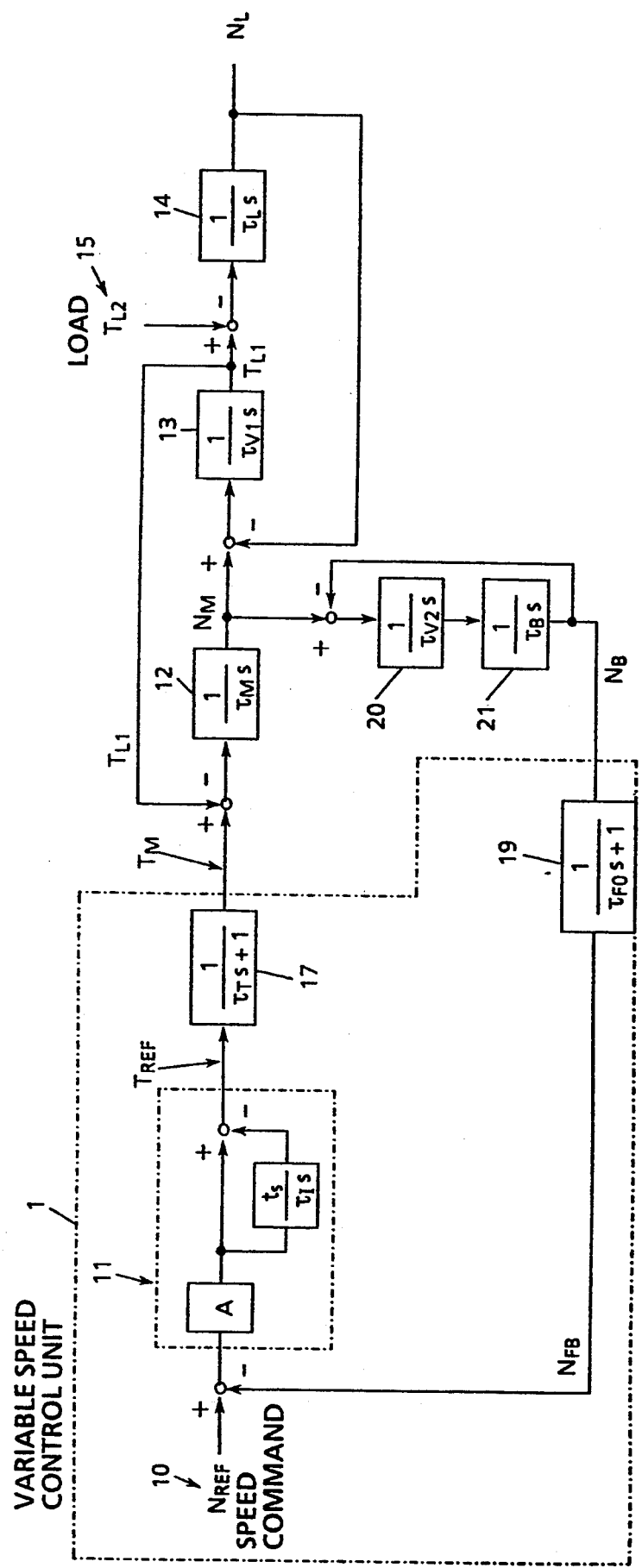
FIG. 6 is a block diagram showing the speed control of a speed control system of the prior art for the system of FIG. 5.
Figure 7:
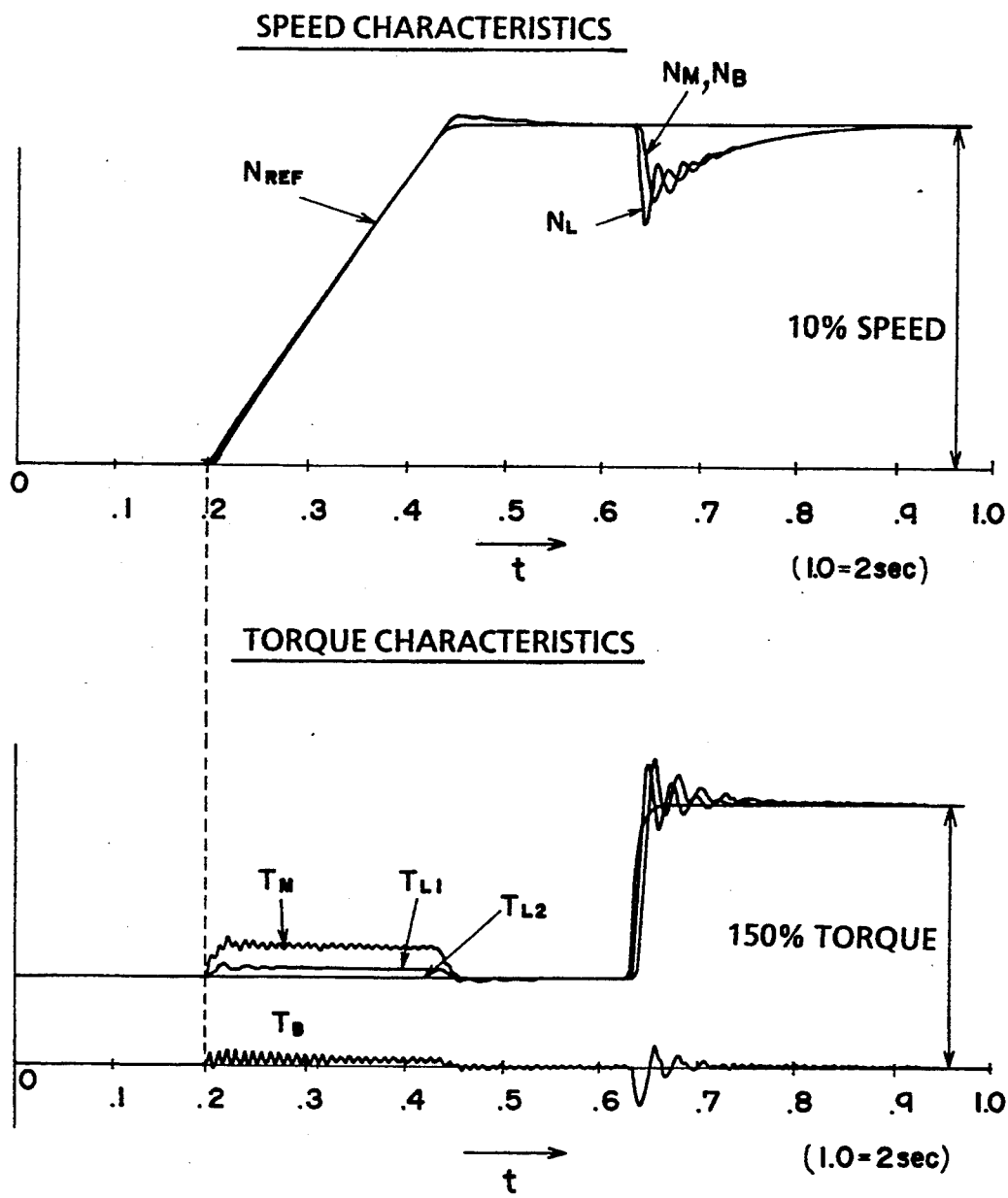
FIG. 7 is a diagram showing the acceleration characteristics and load responding characteristics of a speed control unit where the speed control unit is seriously influenced by a torsional vibration.
Figure 8:
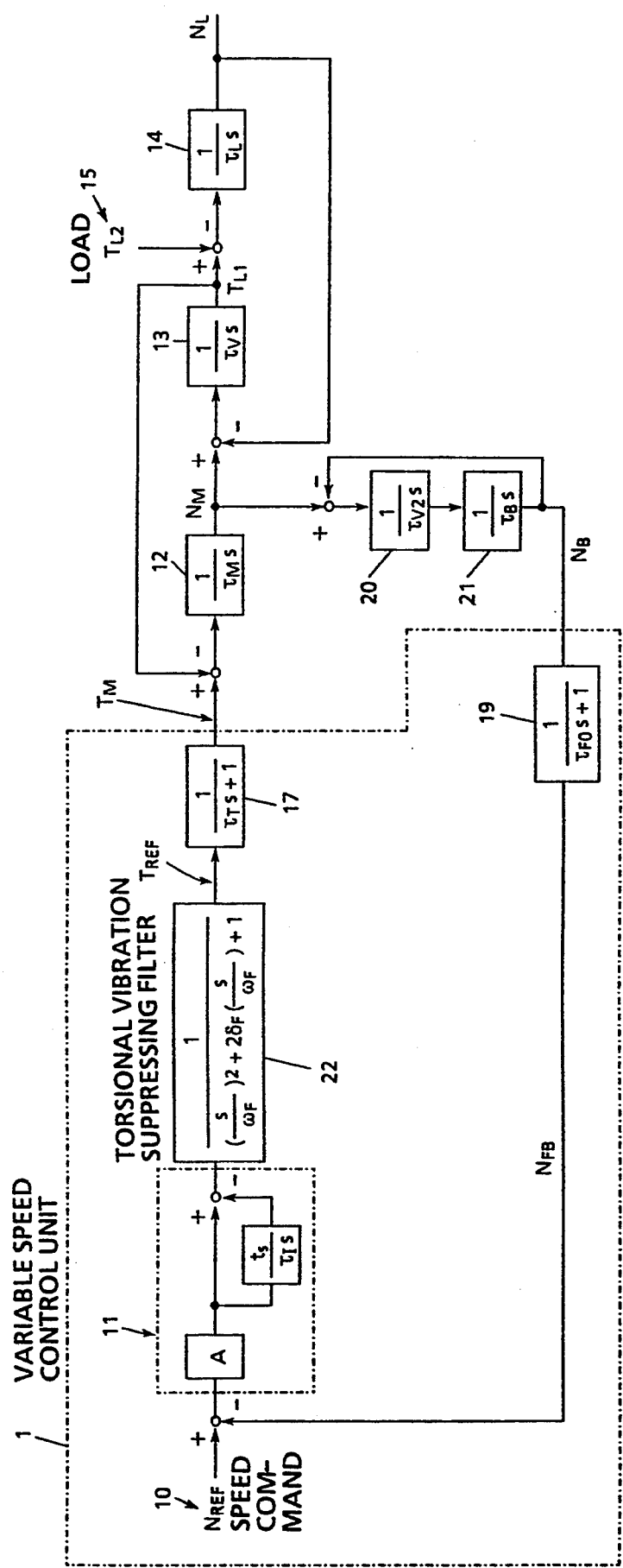
FIG. 8 is a block diagram showing a speed control system equipped with a torsional vibration suppressing filter of the prior art.
Figure 13:
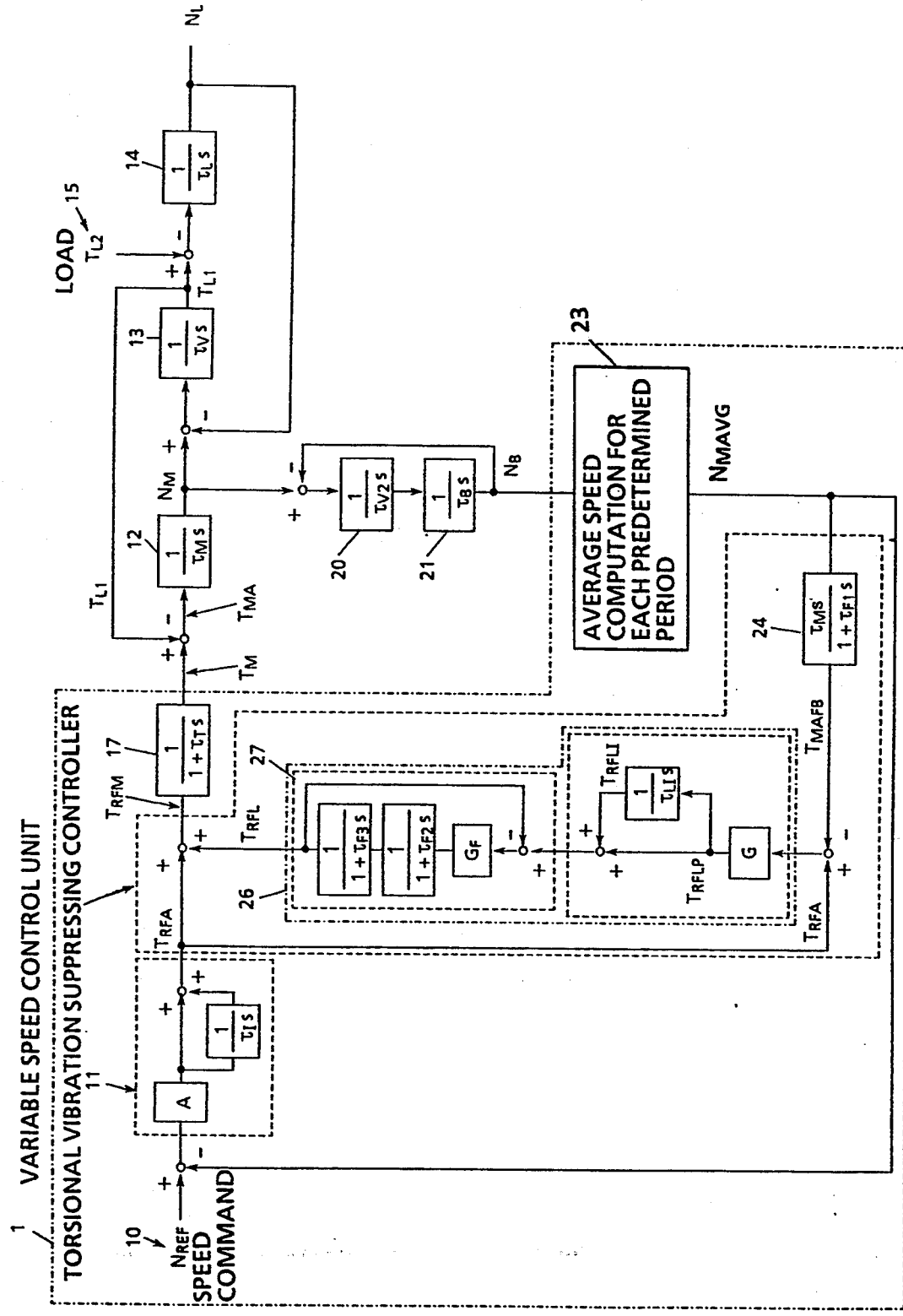
FIG. 13 is a block diagram showing a third embodiment of the present invention.

FIG. 13 is a block diagram showing a speed control unit having a shaft vibration suppressing function, as a third embodiment of the present invention. Incidentally, the same components as those of FIG. 6 showing the example of the prior art are designated with identical reference characters, and their description will be omitted. An average value of the signals of the detector, which is mounted on the rotary shaft of the electric motor at the side opposite the load, is computed to an average speed $N_{MAVG}$, and the operation of the speed controller 11 will be described first.

If the speed command $N_{REF}$, the average speed signal $N_{MAVG}$ and their deviation are inputted to the speed controller 11, this controller 11 outputs the signal, which is the addition of a signal prepared by multiplying the speed deviation signal by the proportional gain A and a signal prepared by integrating the prepared signal with the time constant $\tau_I$, as the torque command signal $T_{RFA}$. In case the speed controller 11 has the proportional gain A only, it outputs the signal, which is prepared by multiplying the corresponding speed deviation signal by the gain A, as the torque command signal $T_{RFA}$.

The motor acceleration torque computer 24 will not be described because it has absolutely the same computing function as that of the block of FIG. 9.

The operation of a motor acceleration torque controller 26 will be described in the following.

The torque command signal $T_{RFA}$ of the speed controller 11 is used as the acceleration torque command of the electric motor, and the output signal $T_{MAFB}$ of the motor acceleration torque computer 24 is fed back as the motor acceleration torque signal in response to said acceleration torque command. If the deviation of these two signals is inputted to the motor acceleration torque controller 26, this controller 26 outputs the signal, which is generated through a filter 27 having a second-order lag element composed of two first-order lag element signal time constants $\tau_{F2}$ and $\tau_{F3}$ and a proportional gain $G_F$ from the signal $T_{RFL}$ obtained from the addition of the signal $T_{RFLP}$ prepared by multiplying the deviation signal of those two signals by the proportional gain G and the signal $T_{RFLI}$ prepared by integrating the signal $T_{RFLP}$ with the time constant $\tau_{L1}$, so that the motor acceleration torque feedback signal $T_{MAFB}$ may be identical to the torque command signal $T_{RFA}$ outputted from the speed controller 11.

By controlling the torque of the electric motor through use of the signal, which is the addition of the torque command signal $T_{RFA}$ outputted from the speed controller 11 and the output signal $T_{RFL}$ of the motor acceleration torque controller 26, as the torque command $T_{RFM}$, the load torque $\tau_{L1}$ disturbing the acceleration torque of the electric motor is canceled by the torque command compensating signal $T_{RFL}$ outputted from the motor acceleration torque controller 26. As a result, the aforementioned motor torque command signal acts to cancel the disturbance torque of the electric motor, which is generated by the torsions of the electric motor at the load side and at the opposite side during the acceleration and at an abrupt load changing time, thereby to suppress the torsional vibration.

FIG. 13 is a block diagram showing the analog computing method, but this control can also be realized by the digital computation. A fourth embodiment of the digital computing method is shown in FIG. 14, and the flow chart of the computations is shown in FIG. 15.

Figure 14:
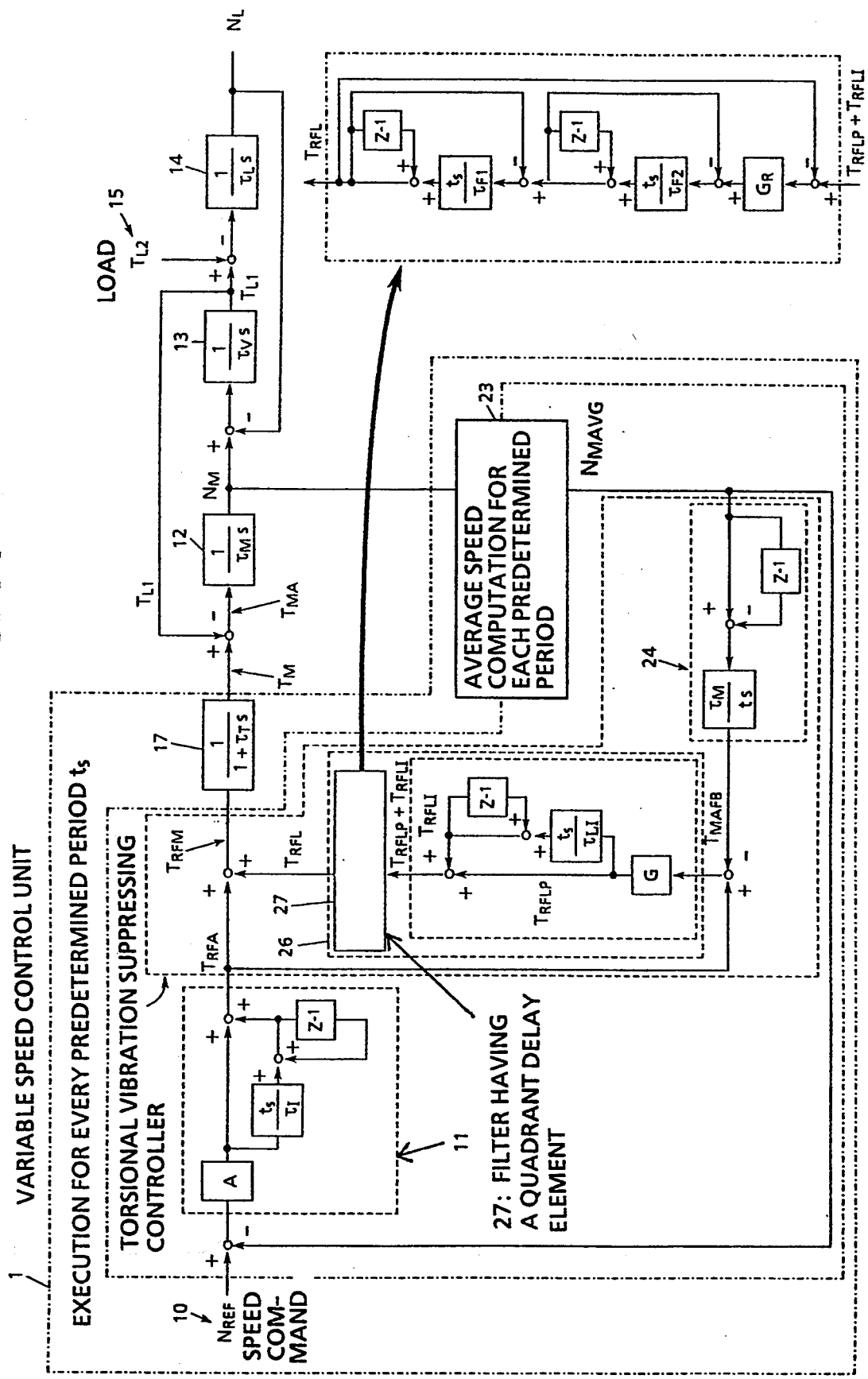
FIG. 14 is a block diagram showing a fourth embodiment of the present invention.
Figure 15:
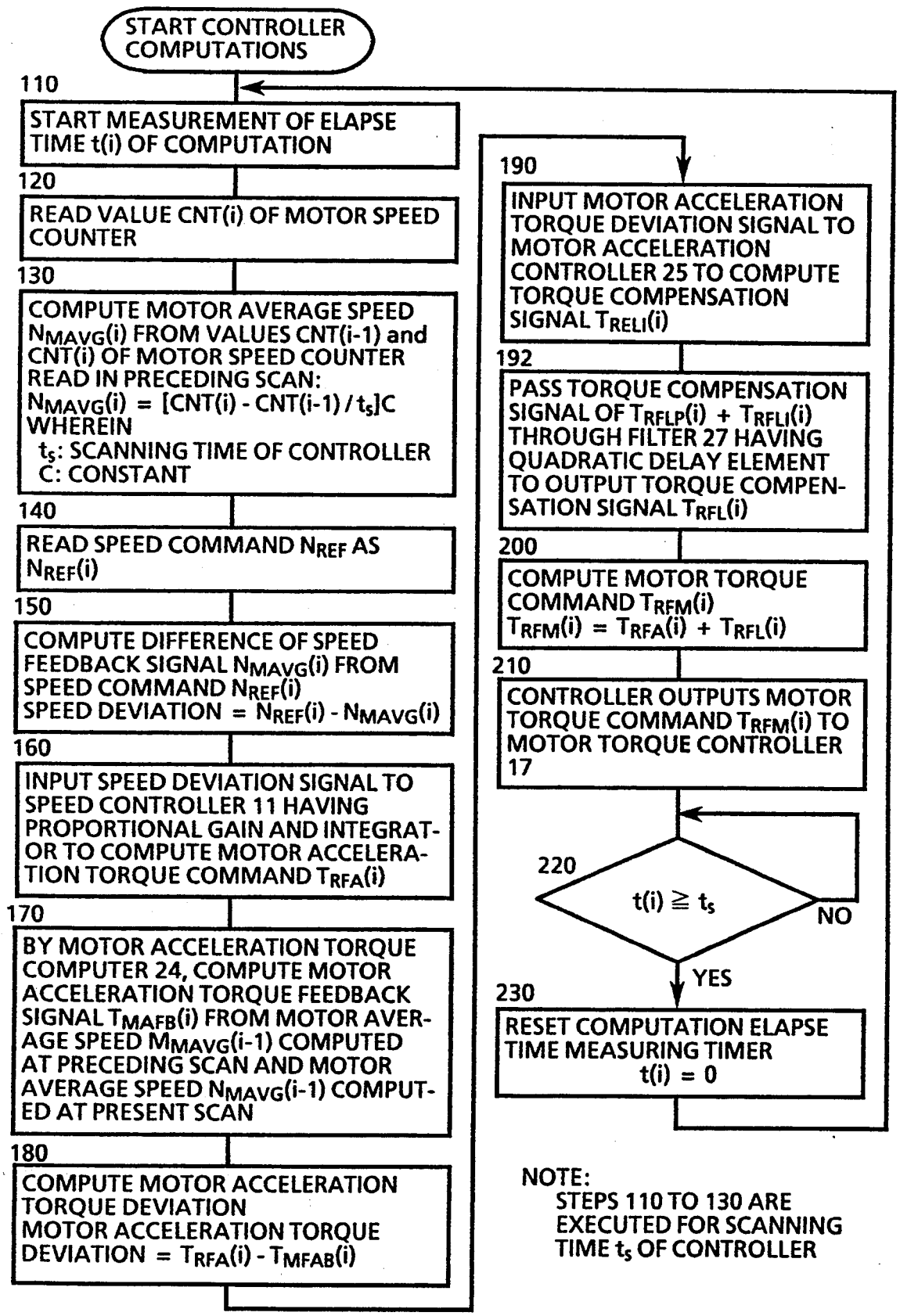
FIG. 15 is a flow chart showing the computations in the fourth embodiment.

In the method of FIG. 13, the computations are analog, but the analog computations are replaced by digital computations in the method of FIG. 14.

Figure 16:
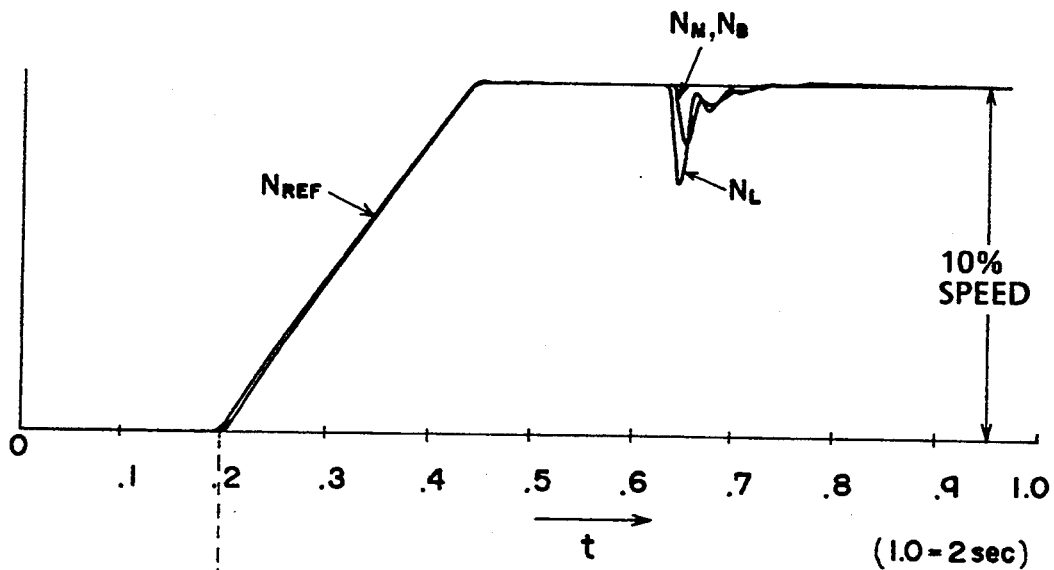
FIG. 16 is a diagram showing the acceleration characteristics and load responding characteristics of the speed control unit and exhibiting the effects of the present embodiment.
Figure 16:
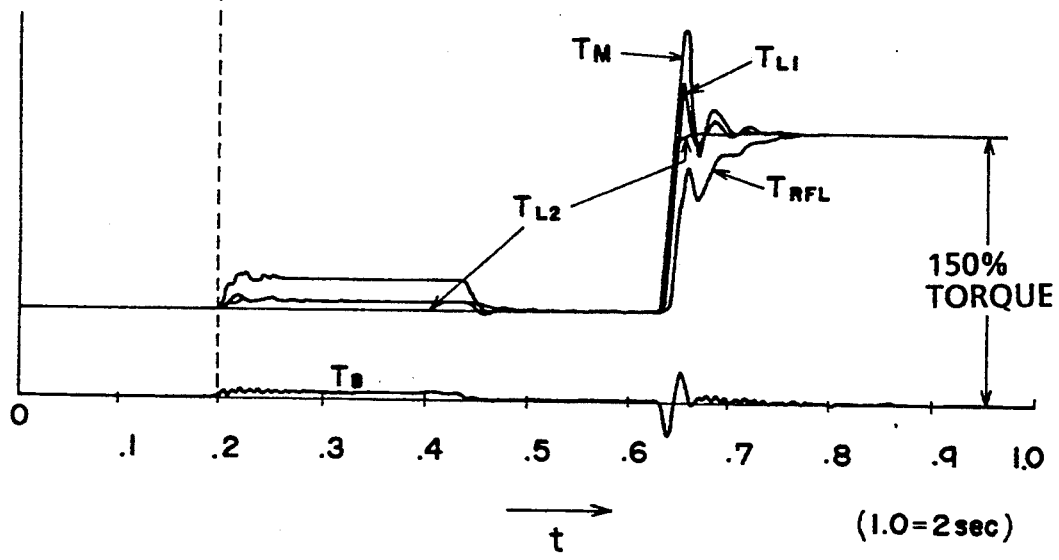

FIG. 16 shows the stable variable speed characteristics, in which the shaft vibrations of the electric motor at the load side and at the opposite side are suppressed by applying the present invention.

INDUSTRIAL FEASIBILITY

The present invention can be utilized for controlling a mechanical system for transmitting the rotational force of an electric motor through a drive shaft of low torsional rigidity, which is disposed either at a load side or at the load side and the opposite side, to mechanical facilities such as milling machines in the field of steel industries, process lines, or paper making machines and fiber machines in the field of general industries.

We claim:

1. A method for suppressing torsional vibration in an electric motor speed control system including a mechanism for transmitting a drive torque from an electric motor to a load through a drive shaft of a low torsional rigidity disposed at a load side of the electric motor, and a control apparatus for controlling a torque of the electric motor in accordance with a torque command signal $T_{RFA}$ obtained by amplifying a deviation signal between a motor average speed $N_{MAVG}$ and a speed command $N_{REF}$ by a speed controller having a proportional gain;

said method comprising the steps of:

feeding back to said torque command signal $T_{RFA}$ a signal which is prepared by multiplying a signal made by substantially differentiating said motor average speed $N_{MAVG}$ by a mechanical time constant $\tau_M$, as a feedback signal $T_{MAFB}$ of a motor acceleration torque;

obtaining a torque compensating signal $T_{RFL}$ by amplifying a deviation signal between said torque command signal $T_{RFA}$ and said feedback signal $T_{MAFB}$ through a proportional gain and an integrator;

preparing a torque control signal $T_{RFM}$ by adding the torque compensating signal $T_{RFL}$ to the torque command signal $T_{RFA}$ outputted from said speed controller; and controlling a torque of said electric motor in accordance with said torque control signal $T_{RFM}$, thereby canceling a motor load torque by said torque compensating signal $T_{RFL}$ which is computed and outputted so that said torque command signal $T_{RFA}$ outputted from said speed controller may accord with said motor acceleration feedback signal $T_{MAFB}$.

2. A method according to claim 1, wherein said speed controller further includes an integrator.

3. A method according to claim 1, further including the step of obtaining said motor average speed $N_{MAVG}$ by computing a mean value of detected motor speed signals at intervals of constant periods.

4. A method according to claim 1, further including the step of obtaining said motor average speed $N_{MAVG}$ by leveling said detected motor speed signals through a filter having a first order lag element.

5. An electric motor control apparatus to be used in a motor speed control system having a mechanism for transmitting a drive torque from an electric motor to a load through a drive shaft of low rigidity disposed at a load side of the electric motor, and a control apparatus for controlling a torque of the electric motor in accordance with a torque command signal $T_{RFA}$ obtained by amplifying the deviation signal between a motor average speed $N_{MAVG}$ and a speed command $N_{REF}$ in a speed controller having a proportional gain;

said apparatus comprising:

motor acceleration torque control means having a proportional gain and an integrator, for computing a torque command compensating signal $T_{RFL}$ from a deviation signal between the torque command signal $T_{RFA}$ outputted from said speed control means and a signal which is prepared by multiplying a signal made by substantially differentiating said motor average speed $N_{MAVG}$ by a mechanical time constant $\tau_M$ of the electric motor; and motor torque control means for controlling the torque of the electric motor in accordance with a torque command $T_{RFM}$ formed by the addition of the torque command signal $T_{RFA}$ outputted from said speed control means and the torque command compensating signal $T_{RFL}$ outputted from said motor acceleration torque control means.

6. An apparatus according to claim 5, wherein said speed controller further includes an integrator.

7. An apparatus according to claim 5, further including means for obtaining said average speed $N_{MAVG}$ by computing a mean value of detected motor speed signals at intervals of constant periods.

8. An apparatus according to claim 5, further including means for obtaining said motor average speed $N_{MAVG}$ by leveling said detected motor speed signals through a filter having a first order lag element.

9. A method for suppressing torsional vibration in an electric motor speed control system including a mechanism for transmitting a rotational torque from an electric motor to a machine through a drive shaft of low torsional rigidity disposed at a load side of the electric motor, and a control apparatus for controlling a torque of the electric motor in accordance with a torque command signal $T_{RFA}$ obtained by amplifying the deviation signal between a motor average speed $N_{MAVG}$ and a speed command $N_{REF}$ by a speed controller having a proportional gain;

said method comprising the steps of:

feeding back to said torque command signal $T_{RFA}$ a signal which is prepared by multiplying a signal made by substantially differentiating said motor average speed $N_{MAVG}$ by the mechanical time constant $\tau_M$, as a feedback signal $T_{MAFB}$ of a motor acceleration torque;

obtaining a torque compensating signal $T_{RFL}$ by amplifying a deviation signal between said torque command signal $T_{RFA}$ and said feedback signal $T_{MAFB}$ whose high frequency signals are eliminated by a proportional integration arithmetic unit and a filter having a quadratic lag element at the output side;

preparing a torque control signal $T_{RFM}$ by adding the torque compensating signal $T_{RFL}$; and controlling a torque of said electric motor in accordance with said torque control signal $T_{RFM}$, thereby canceling a motor load torque by said torque compensating signal $T_{RFL}$ which is computed and outputted so that said torque command signal $T_{RFA}$ outputted from said speed controller may accord with said motor acceleration feedback signal $T_{MAFB}$.

10. A method according to claim 9, wherein said speed controller further includes an integrator.

11. A method according to claim 9, further including the step of obtaining said motor average speed $N_{MAVG}$ by computing a mean value of detected motor speed signals at intervals of constant periods.

12. A method according to claim 9, further including the step of obtaining said motor average speed $N_{MAVG}$ by leveling said detected motor speed signals through a filter having a first order lag element.

13. An electric motor control apparatus to be used in a motor speed control system including a mechanism for transmitting a rotational torque from an electric motor to a machine through a drive shaft of low rigidity disposed at a load side of the electric motor, and a control apparatus for controlling a torque of the electric motor in accordance with a torque command signal $T_{RFA}$ obtained by amplifying the deviation signal between a motor average speed $N_{MAVG}$ and a speed command $N_{REF}$ by a speed controller having a proportional gain;

said apparatus comprising:

motor acceleration torque control means having a proportional gain, an integrator and a filter having a quadratic lag element, for computing a torque command compensating signal $T_{RFL}$ from a deviation signal between the torque command signal $T_{RFA}$ outputted from said speed control means, and a signal which is prepared by multiplying a signal made by substantially differentiating said motor average speed $N_{MAVG}$ by a mechanical time constant $\tau_M$ of the electric motor; and motor torque control means for controlling the torque of the electric motor in accordance with a torque command $T_{RFM}$ formed by the addition of the torque command signal $T_{RFA}$ outputted from said speed control means and the torque command compensating signal $T_{RFL}$ outputted from said motor acceleration torque control means.

14. An apparatus according to claim 13, wherein said speed controller further includes an integrator.

15. An apparatus according to claim 13, further including means for obtaining said motor average speed $N_{MAVG}$ by computing a mean value of detected motor speed signals at intervals of constant periods.

16. An apparatus according to claim 13, further including means for obtaining said motor average speed $N_{MAVG}$ by leveling said detected motor speed signals through a filter having a first order lag element.

* * * * *